US010534512B2

(12) United States Patent
Jadhav et al.

(10) Patent No.: US 10,534,512 B2
(45) Date of Patent: Jan. 14, 2020

(54) SYSTEM AND METHOD FOR IDENTIFYING WEB ELEMENTS PRESENT ON A WEB-PAGE

(71) Applicant: Tata Consultancy Services Limited, Mumbai (IN)

(72) Inventors: Charudatta Jadhav, Mumbai (IN); Syed Absar Ahmad, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 760 days.

(21) Appl. No.: 14/638,857

(22) Filed: Mar. 4, 2015

(65) Prior Publication Data

US 2016/0259773 A1 Sep. 8, 2016

(51) Int. Cl.
*G06F 3/0484* (2013.01)
*G06F 17/22* (2006.01)
*G06F 17/27* (2006.01)

(52) U.S. Cl.
CPC ........ *G06F 3/0484* (2013.01); *G06F 3/04842* (2013.01); *G06F 3/04847* (2013.01);
(Continued)

(58) Field of Classification Search
CPC . G06F 8/34; G06F 8/30; G06F 17/272; G06F 17/2247; G06F 17/3089;
(Continued)

(56) References Cited

U.S. PATENT DOCUMENTS 7,028,223 B1 * 4/2006 Kolawa ............... G06F 11/3688
714/37
7,200,804 B1 * 4/2007 Khavari ............... G06F 17/243
707/E17.108
(Continued)

FOREIGN PATENT DOCUMENTS

CN    103218286 A    7/2013

OTHER PUBLICATIONS

"Using UI Automation for Automated Testing," Microsoft Corporation, retrieved on Mar. 3, 2015 (4 pages).
(Continued)

*Primary Examiner* — Justin R. Blaufeld
*Assistant Examiner* — Phoebe X Pan
(74) *Attorney, Agent, or Firm* — Finnegan, Henderson, Farabow, Garrett & Dunner LLP (57) ABSTRACT

Disclosed is a system for identifying one or more web elements present on a web-page. A web-page receiving module may receive a web-page comprising a plurality of web elements. A parameter recording module may record one or more parameters corresponding to a web element of the plurality of web elements. A simulation module may simulate interaction of one or more input devices with the web element in order to determine behavior of the web element. The simulation module may further record change in the one or more parameters based on the interaction simulated. The change in the one or more parameters may be recorded upon triggering of at least one event. A web-
(Continued)

element identification module may identify the web element based on the behavior of the web element and the change recorded in the one or more parameters.

9 Claims, 3 Drawing Sheets

(52) U.S. Cl.
CPC ........ *G06F 17/2247* (2013.01); *G06F 17/272* (2013.01); *G06F 17/2705* (2013.01); *G06F 17/2725* (2013.01)

(58) Field of Classification Search
CPC ............... G06F 17/30899; G06F 17/30; G06F 17/2705; G06F 17/30861; G06F 3/0484; G06F 3/04845; G06F 3/04847; G06F 3/04842; H04L 67/02; H04L 29/06095; G09B 1/00
See application file for complete search history.

(56) References Cited

U.S. PATENT DOCUMENTS

| | | | | |
|---|---|---|---|---|
| 7,231,606 | B2* | 6/2007 | Miller | H04L 43/50 702/186 |
| 7,343,626 | B1* | 3/2008 | Gallagher | G06F 21/577 707/999.003 |
| 7,523,223 | B2* | 4/2009 | Chen | G06F 17/30905 709/219 |
| 7,554,522 | B2* | 6/2009 | Sinclair, II | G06F 3/0481 345/156 |
| 7,634,549 | B1* | 12/2009 | Ghaisas | G06Q 10/10 709/220 |
| 7,966,604 | B2* | 6/2011 | Tomar | G06F 9/4486 717/127 |
| 8,001,532 | B1* | 8/2011 | Jakubiak | G06F 11/3684 714/46 |
| 8,196,104 | B2* | 6/2012 | Cohrs | G06F 11/3672 717/124 |
| 8,607,251 | B1 | 12/2013 | Guillory et al. | |
| 8,713,438 | B1* | 4/2014 | Broniek | G06F 17/241 715/715 |
| 9,639,626 | B2* | 5/2017 | Gnech | G06F 17/30899 |
| 9,852,049 | B2* | 12/2017 | Hey | G06F 11/3668 |
| 2003/0005044 | A1* | 1/2003 | Miller | H04L 43/50 709/203 |
| 2003/0159063 | A1* | 8/2003 | Apfelbaum | G06F 21/577 726/25 |
| 2004/0019677 | A1* | 1/2004 | Fukumoto | G06F 11/3447 709/224 |
| 2004/0111727 | A1* | 6/2004 | Schwarzbauer | G06F 11/36 719/310 |
| 2005/0166094 | A1* | 7/2005 | Blackwell | G06F 11/3664 714/38.14 |
| 2006/0015571 | A1* | 1/2006 | Fukuda | G06F 16/958 709/217 |
| 2006/0085764 | A1* | 4/2006 | Klementiev | G06F 3/0481 715/853 |
| 2006/0230011 | A1* | 10/2006 | Tuttle | G06F 17/30864 706/62 |
| 2006/0282771 | A1* | 12/2006 | Vinci | G06F 17/2247 715/209 |
| 2007/0006036 | A1* | 1/2007 | Devas | G06F 11/36 714/38.14 |
| 2007/0043701 | A1* | 2/2007 | Klementiev | G06F 9/451 |
| 2007/0050703 | A1* | 3/2007 | Lebel | G06F 17/3089 715/234 |
| 2008/0069480 | A1* | 3/2008 | Aarabi | G06F 16/5854 382/305 |
| 2009/0083661 | A1* | 3/2009 | Blinnikka | G06F 17/30905 715/787 |
| 2009/0100345 | A1* | 4/2009 | Miller | G06F 11/3688 715/738 |
| 2009/0150343 | A1* | 6/2009 | English | G06Q 30/0603 |
| 2009/0228805 | A1* | 9/2009 | Ruehle | G06F 9/4435 715/745 |
| 2009/0260024 | A1* | 10/2009 | Dera | G06Q 10/06 719/331 |
| 2009/0300709 | A1* | 12/2009 | Chen | G06F 17/30893 726/1 |
| 2010/0064281 | A1* | 3/2010 | Kimball | H04L 41/0853 717/124 |
| 2010/0131797 | A1* | 5/2010 | Ganesh | G06F 11/34 714/21 |
| 2010/0199170 | A1* | 8/2010 | Hoffman | H04L 63/1416 715/234 |
| 2011/0173589 | A1* | 7/2011 | Guttman | G06F 17/30873 717/125 |
| 2011/0191676 | A1* | 8/2011 | Guttman | G06F 3/00 715/716 |
| 2011/0307868 | A1* | 12/2011 | Schwartz | G06F 11/3692 717/127 |
| 2011/0307893 | A1* | 12/2011 | Schwartz | G06F 11/3688 718/101 |
| 2012/0096010 | A1* | 4/2012 | Schwartz | G06F 17/30607 707/748 |
| 2012/0102461 | A1* | 4/2012 | Schwartz | G06F 9/4443 717/124 |
| 2012/0227044 | A1* | 9/2012 | Arumugham | G06Q 10/06 718/100 |
| 2012/0254723 | A1* | 10/2012 | Kasa | G06F 17/272 715/234 |
| 2013/0138495 | A1* | 5/2013 | Lemphers | G06Q 30/02 705/14.26 |
| 2014/0007156 | A1* | 1/2014 | Navin | H04L 63/10 725/32 |
| 2014/0053021 | A1* | 2/2014 | Schwartz | G06F 9/45512 714/15 |
| 2014/0136944 | A1* | 5/2014 | Harris | G06F 17/211 715/234 |
| 2014/0173744 | A1* | 6/2014 | Borohovski | G06F 21/577 726/25 |
| 2014/0250538 | A1* | 9/2014 | Rapaport | G06F 21/31 726/28 |
| 2015/0082144 | A1* | 3/2015 | Sudkovich | G06F 17/2247 715/234 |
| 2015/0082280 | A1* | 3/2015 | Betak | G06F 11/3692 717/124 |
| 2015/0286556 | A1* | 10/2015 | Ellis | G06F 11/3684 717/125 |
| 2015/0339213 | A1* | 11/2015 | Lee | G06F 11/3664 717/125 |
| 2015/0347284 | A1* | 12/2015 | Hey | G06F 11/3692 717/125 |
| 2016/0011756 | A1* | 1/2016 | Afzal | H04L 67/02 715/747 |
| 2016/0034468 | A1* | 2/2016 | Hart | G06F 17/3053 707/751 |
| 2016/0179658 | A1* | 6/2016 | Avery | G06F 11/3696 717/135 |
| 2016/0212073 | A1* | 7/2016 | Kulkarni | H04L 51/046 |
| 2017/0103072 | A1* | 4/2017 | Yuen | G06F 17/30265 |
| 2017/0168924 | A1* | 6/2017 | Dereszynski | G06F 11/3688 |
| 2017/0277622 | A1* | 9/2017 | Gao | G06F 11/36 |
| 2017/0277625 | A1* | 9/2017 | Shtuchkin | G06F 11/3688 |
| 2017/0324803 | A1* | 11/2017 | Shaath | G06F 11/36 |

OTHER PUBLICATIONS

"UI Testing," Android Developers, retrieved on Mar. 3, 2015 (8 pages).

Chapter 7: Manipulating Client-Side HTML, Microsoft Corporation, retrieved on Mar. 3, 2015 (7 pages).

Abdo Beirekdar, Marc Keita, Monique Noirhomme, Frédéric Randolet, Jean Vanderdonckt, Céline Mariage; "Flexible Reporting for Automated Usability and Accessibility Evaluation of Web Sites"; Fac.

(56) References Cited

OTHER PUBLICATIONS

Univ. Notre-Dame de la Paix and Université catholique de Louvain; 2005; pp. 281-294 (14 pages).

\* cited by examiner

SYSTEM AND METHOD FOR IDENTIFYING WEB ELEMENTS PRESENT ON A WEB-PAGE

TECHNICAL FIELD

The present invention relates generally to the field of automated web accessibility assessment. More particularly, the present invention facilitates a higher degree of automated web accessibility assessment based on identification of web elements present on a web-page.

BACKGROUND

The major challenge faced today in the field of web accessibility assessment is that a major portion of assessment is being done manually which increases effort and cost, due to the limitations in current state of automation. It has been observed that traditional methods used for automating the web accessibility assessment, either utilize Hypertext Markup Language (HTML) with or without Cascading Style Sheets (CSS), JavaScript semantics or HTML Document Object Model (DOM) for identifying web elements present on a web-page. Since the traditional methods identifies each web element based on structure and semantic of HTML code, associated to each web element, the traditional methods are only capable of identifying the web elements such as an image, a table, a heading, a list, hereinafter referred to as basic web elements, with ease and thereby perform the automated web accessibility assessment on the basic web elements.

In addition to the basic web elements, there are some other web elements, hereinafter referred to as complex web elements, present on the web-page which cannot be identified based on the structure and the semantics of the HTML code. Examples of the complex web elements may include, but not limited to, a menubar, a treeview, and a "Completely Automated Public Turing Test to tell Computers and Humans Apart" (CAPTCHA™). It is to be understood that the complex web elements cannot directly inference from the HTML or the HTML DOM because the complex web elements do not have a defined structure or semantic of the HTML code. Hence, the complex web elements are interpreted as the basic web elements and are assessed in the same manner as the basic web elements are assessed by the traditional methods.

The accessibility requirements of the complex web elements are different and more complicated than that of the basic web elements. Therefore, due to complexity in identification of the complex web elements, manual effort is required to identify each web element before assessing the web accessibility and hence increases the effort and the cost of the web accessibility assessment.

SUMMARY

Before the present systems and methods, are described, it is to be understood that this disclosure is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for identifying one or more web elements present on a web-page, and the concepts are further described below in the detailed description. This summary is not intended to identify essential features of the disclosure nor is it intended for use in determining or limiting the scope of the disclosure.

In one implementation, a system for identifying one or more web elements present on a web-page is disclosed. In one aspect, the system may comprise a processor and a memory coupled to the processor. The processor may execute a plurality of modules present in the memory. The plurality of modules may comprise a web-page receiving module, a parameter recording module, a simulation module, and a web-element identification module. The web-page receiving module may receive a web-page comprising a plurality of web elements. The parameter recording module may record one or more parameters corresponding to a web element of the plurality of web elements. The simulation module may simulate interaction of one or more input devices with the web element in order to determine behavior of the web element. The simulation module may further record change in the one or more parameters based on the interaction simulated. The change in the one or more parameters may be recorded upon triggering of at least one event. The web-element identification module may identify the web element based on the behavior of the web element and the change recorded in the one or more parameters.

In another implementation, a method for identifying one or more web elements present on a web-page is disclosed. In order to identify the one or more web elements, initially, a web-page comprising a plurality of web elements may be received. Upon receiving the web-page, one or more parameters corresponding to a web element of the plurality of web elements may be recorded. Subsequently, interaction of one or more input devices with the web element may be simulated in order to determine behavior of the web element. After simulating the interaction, change in the one or more parameters may be recorded based on the interaction simulated. In one aspect, the change in the one or more parameters may be recorded based upon triggering of at least one event. Subsequent to the recording the change, the web element may be identified based on the behavior of the web element and the change recorded in the one or more parameters. In one aspect, the aforementioned method for identifying one or more web elements present on a web-page is performed by a processor using programmed instructions stored in a memory.

In yet another implementation, non-transitory computer readable medium embodying a program executable in a computing device for identifying one or more web elements present on a web-page is disclosed. The program may comprise a program code for receiving a web-page comprising a plurality of web elements. The program may further comprise a program code for recording one or more parameters corresponding to a web element of the plurality of web elements. The program may further comprise a program code for simulating interaction of one or more input devices with the web element in order to determine behavior of the web element. The program may further comprise a program code for recording change in the one or more parameters based on the interaction simulated. In one aspect, the change in the one or more parameters may be recorded upon triggering of at least one event. The program may further comprise a program code for identifying the web element based on the behavior of the web element and the change recorded in the one or more parameters.

BRIEF DESCRIPTION OF DRAWINGS

The foregoing summary, as well as the following detailed description of preferred embodiments, are better understood when read in conjunction with the appended drawing. For the purpose of illustrating the invention, there is shown in the drawing an exemplary construction of the invention, however, the invention is not limited to the specific methods and system illustrated.

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

System(s) and Method(s) for identifying one or more web elements present on a web-page are disclosed. Examples of the one or more web elements may include, but not limited to, an image, a link, a table, a list, a menubar, a treeview, a CAPTCHA™, a slider and a date and timepicker. Though there are various approaches that only facilitate to identify basic web elements based on Hypertext Markup Language (HTML), with or without Cascading Style Sheets (CSS), JavaScript semantics HTML Document Object Model (DOM), the present system and method may further facilitate to identify each web element including complex web elements. Examples of the basic web elements may include, but not limited to, the image, the link, the table, and the list. Examples of the complex web elements may include, but not limited to, the menubar, the treeview, the CAPTCHA™, the slider and the date and timepicker.

In one aspect, the complex web elements may be identified based on behavior and one or more parameters associated to a web element of the plurality of web elements. Examples of the one or more parameters may include, but not limited to, Cascading Style Sheets (CSS), size and position. In order to assess the web accessibility of the web-page, initially, a web-page comprising a plurality of web elements may be received. Once the web-page is received, the one or more parameters corresponding to the web element may be recorded. Subsequently, interaction of one or more input devices, such as a mouse or a keyboard, with the web element may be simulated in order to determine behavior of the web element. In one aspect, the interaction of the one or more input devices with the web element is simulated by using a web driver, a web browser, or a combination thereof. Upon recording the one or more parameters, change in the one or more parameters may be recorded based on interaction of one or more input devices. Upon recording the change, the web element may be identified either as the basic web element or the complex web element. Thus, in this manner, the present system and method facilitate to identify the web element including the complex web elements for the automated web accessibility assessment.

While aspects of described system and method for identifying one or more web elements present on a web-page may be implemented in any number of different computing systems, environments, and/or configurations, the embodiments are described in the context of the following exemplary system.

Figure 1:
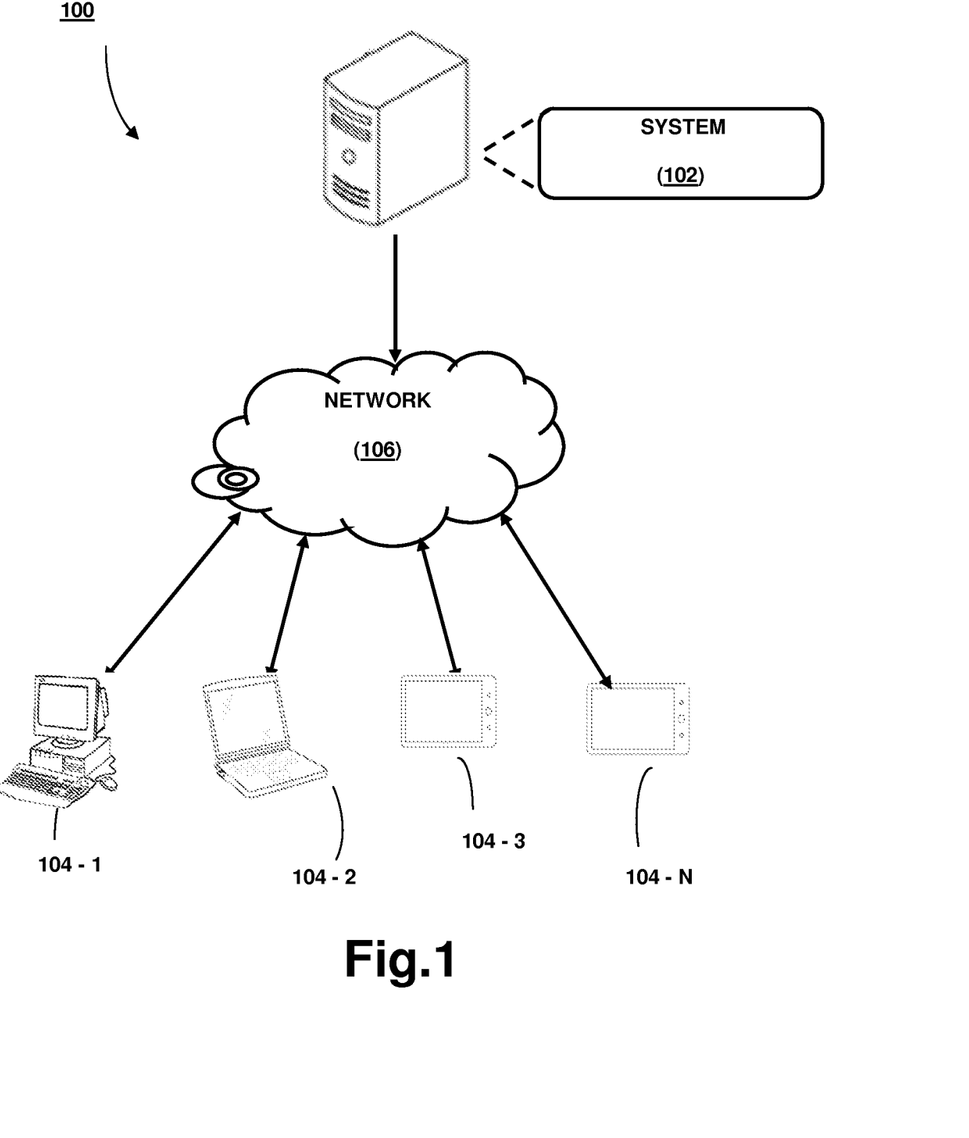
FIG. 1 illustrates a network implementation of a system for identifying one or more web elements present on a web-page is shown, in accordance with an embodiment of the present disclosure.

Referring now to FIG. 1, a network implementation 100 of a system 102 for identifying one or more web elements present on a web-page is disclosed. In order to identify the one or more web elements, initially, the system 102 receives a web-page comprising a plurality of web elements. Upon receiving the web-page, the system 102 records one or more parameters corresponding to a web element of the plurality of web elements. Subsequently, the system 102 simulates interaction of one or more input devices with the web element in order to determine behavior of the web element. After simulating the interaction, the system 102 records change in the one or more parameters based on the interaction simulated. In one aspect, the change in the one or more parameters may be recorded based upon triggering of at least one event. Subsequent to the recording the change, the system 102 identifies the web element based on the behavior of the web element and the change recorded in the one or more parameters.

Although the present disclosure is explained considering that the system 102 is implemented on a server, it may be understood that the system 102 may also be implemented in a variety of computing systems, such as a laptop computer, a mobile communication device (Smartphone), a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
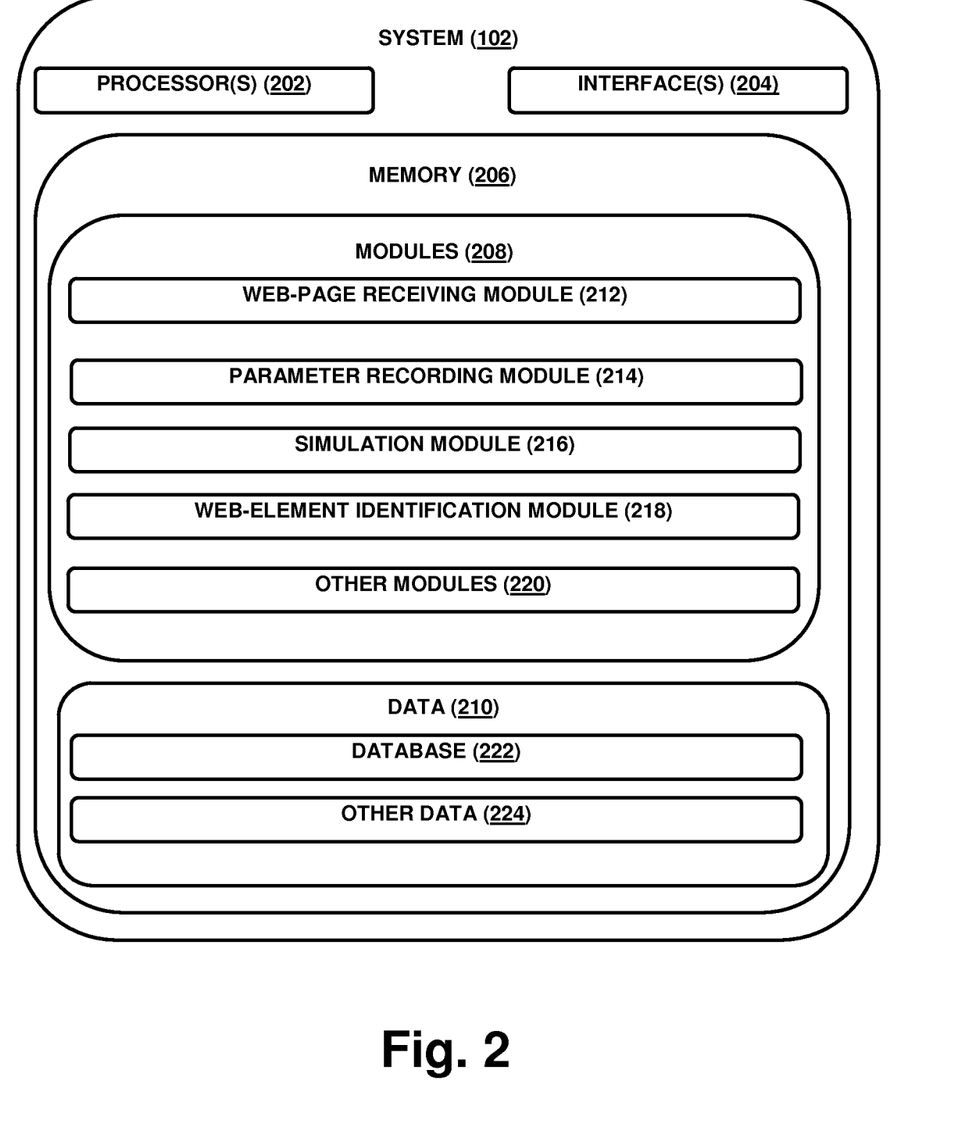
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a web-page receiving module 212, a parameter recording module 214, a simulation module 216, a web-element identification module 218, and other modules 220. The other modules 220 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a database 222 and other data 224. The other data 224 may include data generated as a result of the execution of one or more modules in the other modules 220.

In one implementation, at first, a user may use the client devices 104 to access the system 102 via the I/O interface 204. The user may register themselves using the I/O interface 204 in order to use the system 102. In one aspect, the user may accesses the I/O interface 204 of the system 102 for identifying one or more web elements present on a web-page. In order to identify the one or more web elements, the system 102 may employ the plurality of modules i.e. the web-page receiving module 212, the parameter recording module 214, the simulation module 216, and the web-element identification module 218. The detailed working of the plurality of modules is described below.

It has been observed that a website is created in manner such that users with disabilities can also access a website without other assistance. In order to facilitate web accessibility to the users with disabilities, it is essential to assess the web accessibility of the website before the website is deployed on a server. Since a web-page of the website contains a plurality of web elements of distinct behavior, one of the essential steps for assessing the web accessibility is to identify each web element correctly present on the web-page. Examples of the web elements may include, but not limited to, an image, a link, a table, a list, a menubar, a treeview, a CAPTCHA™, a slider and a date and timepicker. Though there are various traditional approaches to identify the web element based on Hypertext Markup Language (HTML), with or without Cascading Style Sheets (CSS), and Javascript semantics or use HTML Document Object Model (DOM). However such traditional approaches may only facilitate to identify basic web elements correctly and therefore misinterprets complex web elements as the basic elements while assessing the web accessibility. Thus, limiting the automation of assessment the web accessibility. Examples of the basic web elements may include, but not limited to, the image, the link, the table, and the list. Examples of the complex web elements may include, but not limited to, the menubar, the treeview, the CAPTCHA™, the slider and the date and timepicker.

In order to overcome the lacunae of the traditional approaches, the present system may facilitate to identify each web element including the complex web elements. With the purpose of identifying each web element, initially, the web-page receiving module 212 receives the web-page comprising a plurality of web elements. After receiving the web-page, the parameter recording module 214 records one or more parameters corresponding to a web element of the plurality of web elements. Examples of the one or more parameters may include, but not limited to, Cascading Style Sheets (CSS), size and position. Subsequently, the simulation module 216 simulates interaction of one or more input devices with the web element. In one aspect, the interaction of the one or more input devices with the web element is simulated to determine behavior of the web element. The interaction of the one or more input devices with the web element is simulated by using a web driver, a web browser, or a combination thereof.

Subsequent to the simulation, the simulation module 216 further records change in the one or more parameters based on the interaction simulated. In one aspect, the change in the one or more parameters may be recorded based upon triggering of at least one event. The at least one event may include, but not limited to, a hover, a click, a double click, a focus, a key press, and a tab. After recording the change in the one or more parameters, the web-element identification module 218 identifies the web element based on the behavior of the web element and the change recorded in the one or more parameters.

In order to understand the functioning of the system 102, consider web-page that comprises a web element i.e. a 'menubar'. Since the 'menubar' and 'list' are semantically similar as both contain the <li> HTML tag, the system identifies the web element as the complex web element based on behavior corresponding to each web element. It may be understood that the 'menubar' is a list that has the property of displaying sub-menus when mouse is hovered upon one of the sub-menus. Using the web driver and the web browser, the system simulates the interaction of the 'mouse hover' on the list and check whether a 'sub-menu', of the 'sub-menus', is displayed on the screen. Thus, based on the behavior of the 'menubar', the system 102 identifies the web element as the 'menubar' rather than the 'list'.

In one aspect, the behavior of the 'menubar' may include, but not limited to, Style change on hover, Submenu popup on hover or click, May not have submenu, Submenu may be initially open, May contain links. The behavior of the 'menubar' may be determined based on the following method:
1. Create an empty list to contain menubars.
2. Select all list elements on page.
3. For each list; do the following
    a. If the list is visible on page; proceed
    b. If the list has no bullet type; likely to be a menubar
    c. If the list contains links; likely to be a menubar
    d. Select all list-items of the list
    e. Compare the position of the central list-item with its siblings
    f. If the previous sibling is on the left of central item and next sibling is on the right of the central item; the list is horizontally aligned; more likely to be a menubar
    g. If not; the list is vertically aligned; less likely to be a menubar
    h. Select a list-item that contains a non visible child list; If no such item found select an item arbitrarily
    i. On the selected list-item; perform the following steps
        i. Select the element at the centre of the list-item; Record its initial CSS styles such as: color, border-color, border-style, border width, background-color, background-image, font-size, font-weight, font style, etc.
        ii. Use mouse-hover/keyboard-focus event on the element
        iii. If the style changes; more likely to be a menubar
        iv. If the list-item had a hidden child list and the child list is visible; more likely to be a menubar
        v. If not visible; Use mouse-click/keyboard-enter event on the element; Check for change in CSS style and visibility of child list.
    j. Check that the likeness is at-par a threshold;
    k. If yes; the list is a menubar; add to the list of menubars.
    l. If no; the list is not a menubar.
4. All the detected menubars are available in the container list.

Likewise, the behavior of the 'treeview' may include, but not limited to, Style change on hover, Node expand/collapse on click or double click of mouse, May not have child nodes, Initially in expanded state, Each node may have expand/collapse elements or the node as a whole behave similarly. The behavior of the 'treeview' may be determined based on the following method:
1. Create an empty list for storing treeviews
2. Select all list elements on page.
3. For each list; do the following
    a. If the list is visible on page; proceed
    b. Select all list-items of the list
    c. Compare the position of the central list-item with its siblings
    d. If the previous sibling is on top of central item and next sibling is at the bottom of the central item; the list is vertically aligned; more likely to be a treeview
    e. If not; the list is horizontally aligned; cannot be a treeview; skip
    f. For each list-item; do the following
        i. Select the first innermost child of the item as the toggle point of the node
        ii. Check if a child list is already present; Record the visibility state of the child list
        iii. Use mouse-click/keyboard-enter event on the toggle element
        iv. If the visibility of child list changes; more likely to be a treeview; skip check
        v. If child list was not present earlier and a child list appended; more likely to be a treeview; skip check
        vi. If no change happens Use mouse-double click and check again for changes
        vii. If changes happen; likely to be a treeview; skip check
    g. Check that the likeness is at-par a threshold;
    h. If yes; check whether its parent is not present in the list of treeviews
    i. If not; mark as a treeview and add to the list of treeviews; Check if its children present in the same list
    j. If yes; remove them from the list and unmark
4. All the detected treeviews are available in the container list Similarly, the properties of the CAPTCHA™ may include, but not limited to, May use image for challenge, May use audio, or a combination of both, Answer text field may be located below or above the challenge. Button or link may be provided to reload the CAPTCHA™. The behavior of the CAPTCHA™ may be determined based on the following method:
1. Create an empty list to store CAPTCHA™.
2. Select all forms on the page.
3. For each form; do the following
    a. Select all images in the form
    b. For each image; do the following
        i. Search for textfields and links/button in its ancestors, up to a threshold level no further than the form
        ii. If textfield found; Check its distance from the image
        iii. If the distance is within a certain limit; If not associated with another image; mark as CAPTCHA, add it to the list of CAPTCHAs
        iv. If no textfield found; check if link/button to reload the CAPTCHA™ image found
        v. If link/button found; check if its distance is within a certain limit
        vi. If not associated with another image: mark as CAPTCHA™; add it to the list of CAPTCHAs
4. All the detected CAPTCHAs are available in the container list.
5. For audio based CAPTCHAs, search for a link to an audio file in place of image and perform the above steps.
6. For a combination of audio and image in CAPTCHAs, perform test for audio as well as image based CAPTCHAs and combine based on common input field.

Similarly, the behavior of the 'date and timepicker' may include, but not limited to, Selectable date/time values may be contained in a list or a table, The picker may appear in any direction relative to the text field, An inactive link can also be used to invoke the picker. The behavior of the 'date and timepicker' may be determined based on the following method:

1. Select all textfields and inactive links in the page
2. For all selected elements; do the following
    a. Click on the element
    b. Check if a new element has appeared above or below the clicked element
    c. Check if it is not another input field or the page body itself
    d. If the new element is a table/list component and the clicked element is not a child of the new element; can be a picker
    e. Else search for tables and lists inside the new element
    f. If found; check if the clicked element is not a child of the new element
    g. If not; can be a picker
    h. Read the text of the new element along with its child elements in a single string
    i. If the string contains a substring made of 123456 . . . or similar pattern, can be a picker
    j. Check if any list/table child element contains a part of the above substring; If yes, click on it
    k. If the value of the input field or the next sibling of the link changes; mark as picker
    l. If picker is not found above; search for an icon image next to the selected element
    m. If icon found; click on it.
    n. Perform all the above checks and mark as picker appropriately.
3. All the detected pickers have been marked.

Similarly, the behavior of the 'carousel' may include, but not limited to, Content may change on the action of a link or a button, and Multiple controls may be provided to cycle the content. The behavior of the 'carousel' may be determined based on the following method:

1. Create an empty list to store carousels
2. Select all DIV elements on the page
3. For each DIV; do the following
    a. Select the element at the center point of the DIV
    b. If the central element changes over time; the DIV is a part of a carousel.
    c. Else; search for inactive link inside the DIV
    d. If found; click on it; observe the central element
    e. If the central element changes; mark as carousel; add to container list
    f. Else look for links and divs less than a max size, near the DIV (top-bottom-left-right)
    g. If found; click on it; observe the central element
    h. If the central element changes; mark as carousel; add to container list
    i. If DIV's parent present in the container list; remove it from the list and add DIV to the list.
4. All the detected carousels are present in the container list Similarly, the behavior of the 'slider' may include, but not limited to, Can be made up of 'div' tag, May have span or inactive link, Can perform motion in horizontal or vertical direction, A single slider bar may contain multiple sliders, Initial value may be set to the minimum or maximum of the slider, Slider may move single or multiple distance units at a time. The behavior of the 'slider' may be determined based on the following method:

1. Create an empty set to store sliders
2. Select all div, span and inactive links on the page
3. For each selected element; do the following
    a. Check if the element's size is within a threshold and the element is visible on page
    b. If yes; drag the element horizontally followed by drag in vertical direction
    c. If either one of the motion is possible but not both; mark the element's parent as a slider
    d. Add slider to the container set
4. All detected sliders are present in the container set.

Thus, upon determination of the behavior pertaining to each web element, the system 102 identifies the one or more web elements present on the web-page.

Figure 3:
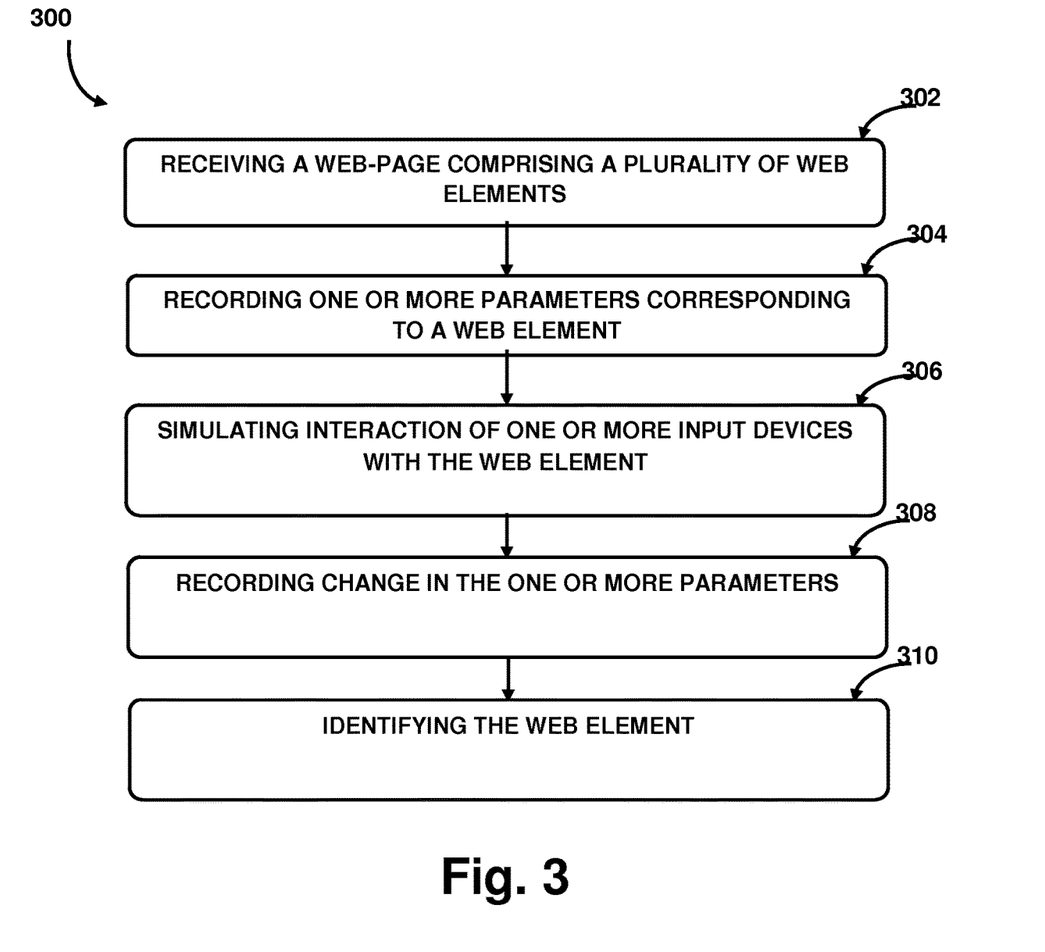
FIG. 3 illustrates a method for identifying one or more web elements present on a web-page, in accordance with an exemplary embodiment of the disclosure.

Referring now to FIG. 3, a method 300 for identifying one or more web elements present on a web-page is shown, in accordance with an embodiment of the present disclosure. The method 300 may be described in the general context of computer executable instructions. Generally, computer executable instructions can include routines, programs, objects, components, data structures, procedures, modules, functions, etc., that perform particular functions or implement particular abstract data types. The method 300 may be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the disclosure described herein. Furthermore, the method can be implemented in any suitable hardware, software, firmware, or combination thereof. However, for ease of explanation, in the embodiments described below, the method 300 may be considered to be implemented in the above described in the system 102.

At block 302, a web-page comprising a plurality of web elements may be received. In one implementation, the plurality of web elements may be received by the web-page receiving module 212.

At block 304, one or more parameters, corresponding to a web element of the plurality of web elements, may be recorded. In one implementation, the one or more parameters may be recorded by the parameter recording module 214.

At block 306, interaction of one or more input devices with the web element may be simulated in order to determine behavior of the web element. In one implementation, the interaction of one or more input devices with the web element may be simulated by the simulation module 216.

At block 308, change in the one or more parameters may be recorded based on the interaction simulated. In one aspect, the change in the one or more parameters may be recorded based upon triggering of at least one event. In one implementation, the change may be recorded by the simulation module 216.

At block 310, the web element may be identified based on the behavior of the web element and the change recorded in the one or more parameters. In one implementation, the web element may be identified by the web-element identification module 218.

Exemplary embodiments discussed above may provide certain advantages. Though not required to practice aspects of the disclosure, these advantages may include those provided by the following features.

Some embodiments enable a system and a method to identify one or more web elements present on a web-page in real-time when the web-page is rendered on a web browser.

Some embodiments enable a system and a method to determine runtime behavior of each web element thereby identifying each web element either as basic web element or complex web element.

Some embodiments enable a system and a method to increase the automation of web accessibility assessment thus reducing the cost and effort required for the web accessibility assessment.

Some embodiments enable a system and a method to differentiate between a basic web element and a complex web element, wherein the basic web element and the complex web element are having similar semantics of HTML code.

Some embodiments enable a system and a method to facilitate automated effort estimation of web accessibility assessment and further facilitate to perform automated sample audit on one or more web pages pertaining to a website.

Although implementations for methods and systems for identifying one or more web elements present on a web-page have been described in language specific to structural features and/or methods, it is to be understood that the appended claims are not necessarily limited to the specific features or methods described. Rather, the specific features and methods are disclosed as examples of implementations for identifying one or more web elements present on a web-page.

What is claimed is:

1. A computer implemented method for identifying one or more web elements present on a web-page, the method comprising:
   receiving, by a processor, a web-page comprising a plurality of web elements, wherein the plurality of web elements comprise a menubar, treeview, completely automated public Turing test to tell computers and humans apart, slider, date picker, and timepicker;
   wherein the completely automated public Turing test to tell computers and humans apart comprises at least one image, a location of an answer text field below or above the image, and a button or link programmed to reload the completely automated public Turing test to tell computers and humans apart;
   recording, by the processor, one or more parameters corresponding to a web element of the plurality of web elements, wherein the one or more parameters comprise at least one of a Cascading Style Sheets (CSS), size, and position;
   simulating, by the processor, interaction of one or more input devices with the web elements using a combination of a web driver and a web browser in order to determine behavior of the web elements,
      wherein the behavior of the menubar comprise at least one of style change on the interaction, and submenu popup on the interaction,
      wherein the behavior of the treeview comprise at least one of style change on the interaction, node expands, and collapses on the interaction,
      wherein the behavior of the date picker and timepicker comprise selection of date and time values by the interaction, and presence of an inactive link to the interaction with the picker, and
      wherein the behavior of the slider comprise at least one of motion in horizontal and vertical direction upon the interaction, presence of multiple sliders in the slider, and movement of at least one distance units at a time upon the interaction;
   recording, by the processor, a change in the one or more parameters based on the simulated interaction, wherein the change in the one or more parameters is recorded upon triggering of at least one event associated with the one or more input devices;
   identifying, by the processor, the web elements based on the behavior of the web elements and the change recorded in the one or more parameters; and
   identifying further, by the processor, the web element corresponding to the completely automated Turing test to tell computers and human apart by:
   selecting all forms on the web-page;
      for each selected form, selecting all images within the selected form; and
         searching for the answer text field within the form, checking a distance between the answer text field and the image,
         when the distance is within a limit, marking the image as the completely automated public Turing test to tell computers and humans apart, and
         adding the image to a list of completely automated public Turing tests to tell computers and humans apart.

2. The method of claim 1, wherein the at least one event includes a hover, click, double click, focus, key press, or tab.

3. The method of claim 1, wherein the plurality of web elements includes an image, link, table, and list.

4. A system for identifying one or more web elements present on a web-page, the system comprising:
   a processor; and
   a memory coupled to the processor, wherein the processor executes a plurality of modules stored in the memory, the plurality of modules comprising:
      a web-page receiving module for receiving a web-page comprising a plurality of web elements, wherein the plurality of web elements comprise a menubar, treeview, completely automated public Turing test to tell computers and humans apart, slider, date picker, and timepicker;
      wherein the completely automated public Turing test to tell computers and humans apart comprises at least one image, a location of an answer text field below or above the image, and a button or link programmed to reload the completely automated public Turing test to tell computers and humans apart;
      a parameter recording module for recording one or more parameters corresponding to a web element of the plurality of web elements, wherein the one or more parameters comprise at least one of Cascading Style Sheets (CSS), size, and position;
      a simulation module for:
         simulating interaction of one or more input devices with the web elements using a combination of a web driver and a web browser in order to determine behavior of the web elements, and recording a change in the one or more parameters based on the simulated interaction, wherein the change in the one or more parameters is recorded upon triggering of at least one event,
            wherein the behavior of the menubar comprise at least one of style change on the interaction, and submenu popup on the interaction, wherein the behavior of the treeview comprise at least one of style change on the interaction, node expands and collapses on the interaction, wherein the behavior of the date picker and timepicker comprise selection of date and time values by the interaction, and presence of an inactive link to the interaction with the picker, and wherein the behavior of the slider comprise at least one of motion in horizontal and vertical direction upon the interaction, presence of multiple sliders in the slider, and movement of at least one distance units at a time upon the interaction; and a web-element identification module for identifying the web elements based on the behavior of the web elements and the change recorded in the one or more parameters; and wherein the web-element identification module further identifies the web element corresponding to completed automated Turing test to tell computers and human apart by:

selecting all forms on the web-page;

for each selected form, selecting all images within the selected form; and     for each selected image:

searching for the answer text field within the form,       checking a distance between the answer text field and the image,       when the distance is within a limit, marking the image as the completely automated public Turing test to tell computers and humans apart, and adding the image to a list of completely automated public Turing tests to tell computers and humans apart.

5. The system of claim 4, wherein the at least one event includes a hover, click, double click, focus, key press, or tab.

6. The system of claim 4, wherein the plurality of web elements includes an image, link, table, list, and carousel.

7. A non-transitory computer readable medium comprising program codes executable by at least one processor for identifying one or more web elements present on a web-page, the program codes comprising:

a program code for receiving a web-page comprising a plurality of web elements, wherein the plurality of web elements comprise a menubar, treeview, completely automated public Turing test to tell computers and humans apart, slider, date picker, and timepicker;

wherein the completely automated public Turing test to tell computers and humans apart comprises at least one image, a location of an answer text field below or above the image, and a button or link programmed to reload the completely automated public Turing test to tell computers and humans apart;

a program code for recording one or more parameters corresponding to a web element of the plurality of web elements, wherein the one or more parameters comprise at least one of Cascading Style Sheets (CSS), size, and position;

a program code for simulating interaction of one or more input devices with the web elements using a combination of a web driver and a web browser in order to determine behavior of the web elements, wherein the behavior of the menubar comprise at least one of style change on the interaction, and submenu popup on the interaction, wherein the behavior of the treeview comprise at least one of style change on the interaction, node expands and collapses on the interaction, wherein the behavior of the date picker and timepicker comprise selection of date and time values by the interaction, and presence of an inactive link to cot the interaction with the picker, and wherein the behavior of the slider comprise at least one of motion in horizontal and vertical direction upon the interaction, presence of multiple sliders in the slider, and movement of at least one distance units at a time upon the interaction;

a program code for recording a change in the one or more parameters based on the simulated interaction, wherein the change in the one or more parameters is recorded upon triggering of at least one event associated with the one or more input devices; and a program code for identifying the web elements based on the behavior of the web elements and the change recorded in the one or more parameters; and wherein the program code further identifies the web element corresponding to completed automated Turing test to tell computers and human apart by:

selecting all forms on the web-page;

for each form, selecting all images within the selected form; and for each selected image:

searching for the answer text field within the form,       checking a distance between the answer text field and the image,       when the distance is within a limit, marking the image as the completely automated public Turing test to tell computers and humans apart, and adding the image to a list of completely automated public Turing tests to tell computers and humans apart.

8. The medium of claim 7, wherein the at least one event includes a hover, click, double click, focus, key press, or tab.

9. The medium of claim 7, wherein the plurality of web elements includes an image, link, table, list, and carousel.

* * * * *